United States Patent [19]
Cai et al.

[11] Patent Number: 6,056,890
[45] Date of Patent: May 2, 2000

[54] FERRIMAGNETIC MATERIALS WITH TEMPERATURE STABILITY AND METHOD OF MANUFACTURING

[75] Inventors: Weilong Cai; Thomas F. Pomponio, both of Rochester, N.Y.

[73] Assignee: Ferronics Incorporated

[21] Appl. No.: 09/065,890

[22] Filed: Apr. 23, 1998

[51] Int. Cl.[7] .............. C04B 35/26; C04B 35/38; C04B 35/64

[52] U.S. Cl. .................. 252/62.56; 252/62.62

[58] Field of Search .............. 256/62.62, 62.56

[56] References Cited

U.S. PATENT DOCUMENTS

| | | | |
|---|---|---|---|
| 3,337,461 | 8/1967 | Cochardt | 252/62.6 |
| 3,948,785 | 4/1976 | Berchtold | 252/62.62 |
| 4,147,747 | 4/1979 | Iwase et al. | 264/65 |
| 4,656,451 | 4/1987 | Pomponio | 336/46 |
| 4,892,672 | 1/1990 | Scheidecker | 252/62.51 |
| 5,382,304 | 1/1995 | Cockayne et al. | 148/306 |
| 5,432,645 | 7/1995 | Terunuma et al. | 360/126 |
| 5,498,361 | 3/1996 | Matsukawa et al. | 252/62.62 |
| 5,505,865 | 4/1996 | Kumar et al. | 252/62.62 |
| 5,518,641 | 5/1996 | Inuzuka et al. | 252/62.56 |
| 5,523,549 | 6/1996 | Tenzer | 252/62.6 |
| 5,531,922 | 7/1996 | Okinaka et al. | 252/62.56 |
| 5,645,774 | 7/1997 | Reczek et al. | 264/40.1 |

*Primary Examiner*—C. Melissa Koslow
*Attorney, Agent, or Firm*—Harter, Secrest & Emery LLP; Brian B. Shaw

[57] ABSTRACT

A ferrite having a substantially continuous range of grain sizes in a substantially uniform distribution throughout the range of grain size, wherein no single grain size represents more than approximately 10% of the total grains. A method of forming a ferrite is disclosed wherein a first composition which yields a first grain size range upon sintering is combined with a second composition which yields a second different grain size range upon sintering to form a composite, and the composite is sintered to form the ferrite which exhibits a relatively temperature stable behavior within an extended temperature range.

27 Claims, 8 Drawing Sheets

FERRIMAGNETIC MATERIALS WITH TEMPERATURE STABILITY AND METHOD OF MANUFACTURING

FIELD OF THE INVENTION

The present invention relates to ferrimagnetic materials, and more particularly to a ferrimagnetic material having a relatively constant magnetic permeability throughout a relatively wide temperature range, and a method of manufacturing such a ferrimagnetic material.

BACKGROUND OF THE INVENTION

In the telecommunications field, the use of relatively high permeability ferrimagnetic materials, in the range of 5,000 to 20,000 perm, is required in a number of systems. However, the operating environments for these telecommunication devices encompass substantial environmental variances. For example, the temperature in which telecommunication devices must operate may range from −20° C. to as much as 80° C.

In existing ferrimagnetic materials, 40 degree temperature fluctuations often produce a variance in magnetic permeability of more than 20%. Such variance would often limit or preclude operation of the device. Specifically, it has been found that at low temperatures, that magnetic permeability substantially decreases and this change in an operating characteristic of the ferrimagnetic component jeopardizes the communications network.

Generally, the presence of extremely large grain sizes in a ferrimagnetic material has been disfavored. The prior art has provided numerous methods for obtaining substantially uniform grain size in a ferrimagnetic material.

For example, U.S. Pat. No. 5,498,361 discloses a ferrite having an average grain diameter of 5 to 50 microns, wherein the coefficient of variation of grain size is small. Further, the '361 patent discloses that upon forming a mixture, the mixture is combined with a binder and granulated to a mean particle size of 150 microns through a spray dryer and compacted. Subsequently, the compacted material is sintered.

Similarly, U.S. Pat. No. 3,948,785 discloses a method of forming a ferrimagnetic material, which method includes calcining, milling, binder addition and sintering. Each of these processes are performed on a single composition.

However, the need still exists for a ferrimagnetic material that exhibits a relatively stable magnetic permeability throughout a relatively large temperature range. The need also exists for a ferrimagnetic material that has a suppressed or at least reduced primary and secondary magnetic permeability maximums. A further need exists for a method of manufacturing such a ferrimagnetic material.

SUMMARY OF THE INVENTION

The present invention provides a ferrimagnetic material having increased stability of magnetic permeability with respect to temperature fluctuations. The present invention provides a ferrimagnetic material having a relatively stable magnetic permeability over a relatively large temperature range. The present invention also encompasses a method of forming such a ferrimagnetic material.

As used herein, the term "ferrimagnetic material" encompasses those materials characterized by abnormally high magnetic permeability, definite saturation point and appreciable residual magnetism and hysteresis, as well as a subset of materials formed by treating hydrated ferric oxide with an alkali or by heating ferric oxide with a metallic oxide.

Generally the method of forming the ferrimagnetic material includes calcining a first ferrimagnetic material forming composition; calcining a second ferrimagnetic material forming composition; combining the calcined first ferrimagnetic material forming composition and the second ferrimagnetic material forming composition to form a composite; and sintering the composite to form the ferrimagnetic material.

The first ferrimagnetic material forming composition has a magnetic permeability to operating temperature dependency that is different than the second ferrimagnetic material forming composition. It is contemplated the resulting composite has a magnetic permeability to operating temperature dependency that is different than the first ferrimagnetic material forming composition and the second ferrimagnetic material forming composition.

In a preferred embodiment, the first and the second ferrimagnetic material forming compositions are separately calcined and processed to a predetermined mean particle size prior to being mixed together to form the composite.

In a preferred embodiment, the composite is substantially homogeneous. In addition, it is contemplated that the first and second compositions may be formed of identical constituent elements, wherein the relative proportions of the constituent elements are varied.

Alternatively stated, the method may include forming a first composition which yields a first grain size range upon sintering, forming a second composition which yields a second different grain size upon sintering, combining the first composition and second composition prior to sintering to form a composite and sintering the composite. In a preferred method, the first and the second compositions are calcined prior to being combined to form the composite.

The present invention includes a sintered ferrimagnetic material having a substantially continuous range of grain sizes in a substantially uniform distribution throughout the range of grain sizes.

DETAILED DESCRIPTION OF PREFERRED EMBODIMENTS

The present invention encompasses a ferrimagnetic material, wherein the ferrimagnetic material is composed of a multitude of crystal grains. The grains are formed by sintering a first calcined material together with a second separately calcined material. The grains are defined by a grain boundary and have a grain size. The grain size is often measured by cutting and etching a portion of the ferrite, examining the etched portion under a microscope, calculating grain areas and the number of grains. The ferrimagnetic material is a sintered composite including a first calcined ferrimagnetic material forming composition and a second calcined ferrimagnetic material forming composition.

The present ferrimagnetic material exhibits a relatively flat distribution of grain sizes with respect to a percentage of the total number of grains. In a further embodiment, the ferrimagnetic material has no single grain size representing more than approximately 10% of the total number of grains. Thus, the present ferrimagnetic material includes a sintered body having a substantially continuous range of grain sizes in a substantially uniform distribution of grain sizes.

Figure 8:
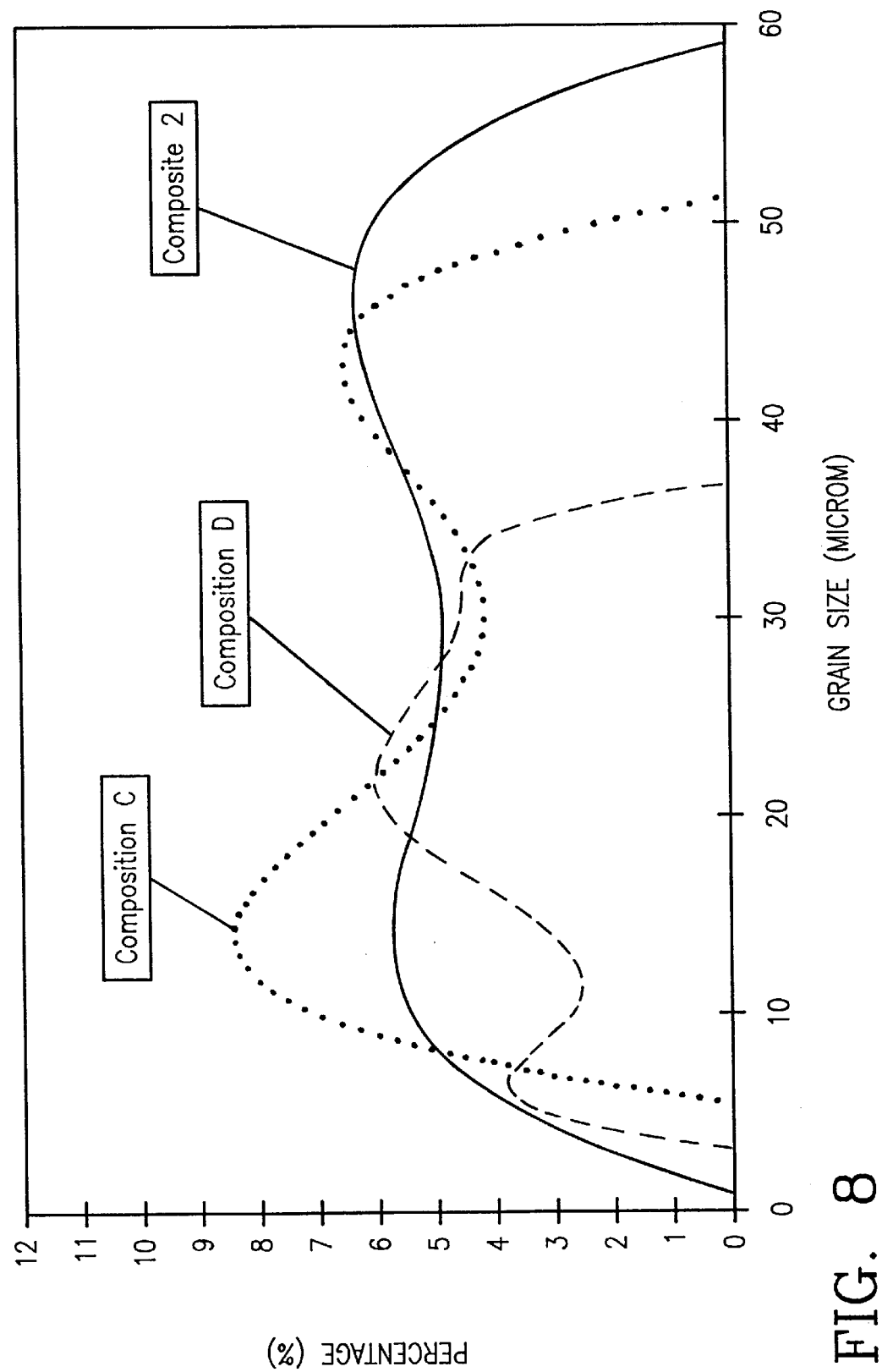
FIG. 8 is a chart showing the relative grain sizes in the second sintered composite as compared to the sintered individual compositions.

Of the cross sectional area of a random portion of the ferrimagnetic material, any given grain size represents approximately two to ten percent of the total number of grains in the cross sectional area. That is, taking a given of the percentage of the total grains represented by the existing grain sizes as shown in FIG. 8, a majority of the cross sectional area is defined by grain sizes representing between approximately 75% and 125% of the given percentage. For example, in a representative cross sectional area, for all the present grain sizes, taking the value of approximately 5.5%, the grain sizes that represent from approximately 4.1% to 6.8% of the total number of grains in the cross sectional area represent approximately 85% of the grains in the cross sectional area. In a preferred embodiment, at least 75% of the grains in a given cross sectional area are defined by grain sizes that are between approximately 85% and 115% of a given percentage of the total number of grains for all the present grains, wherein no single grain size represents more than approximately 10% of the total grains in the cross sectional area.

In the ferrimagnetic material of FIG. 8, the grain sizes range from approximately 1 micrometer to 59 micrometers, wherein approximately 85% of the grain sizes represent between 4% and 6.5% of the total number of grains. That is, within the grain size range, grains having a size of 5 micrometers to 55 micrometers represent 85% of the total number of grains, wherein no single grain size represents more than approximately nine percent of the total number of grains.

Further referring to FIG. 8, in the sintered composite, the grain sizes range from approximately 1 micrometer to approximately 59 micrometers with approximately 80% of the grain sizes lying between 8 micrometers and 54 micrometers such that any given grain size constitutes between approximately 5% and 7% of the total number of grains.

As shown in FIG. 8, in contrast to the grain size range in the sintered composite of approximately 1 micrometers to 59 micrometers, an individually sintered first composition has a grain size range of approximately 3 micrometers to 37 micrometers and an individually sintered second composition has a grain size range of approximately 5 micrometers to 51 micrometers. Thus, the sintered composite has a greater range of grain sizes than either of the compositions. Further, a sintered first composition has a different temperature versus magnetic permeability relationship than a sintered second composition.

Figure 7:
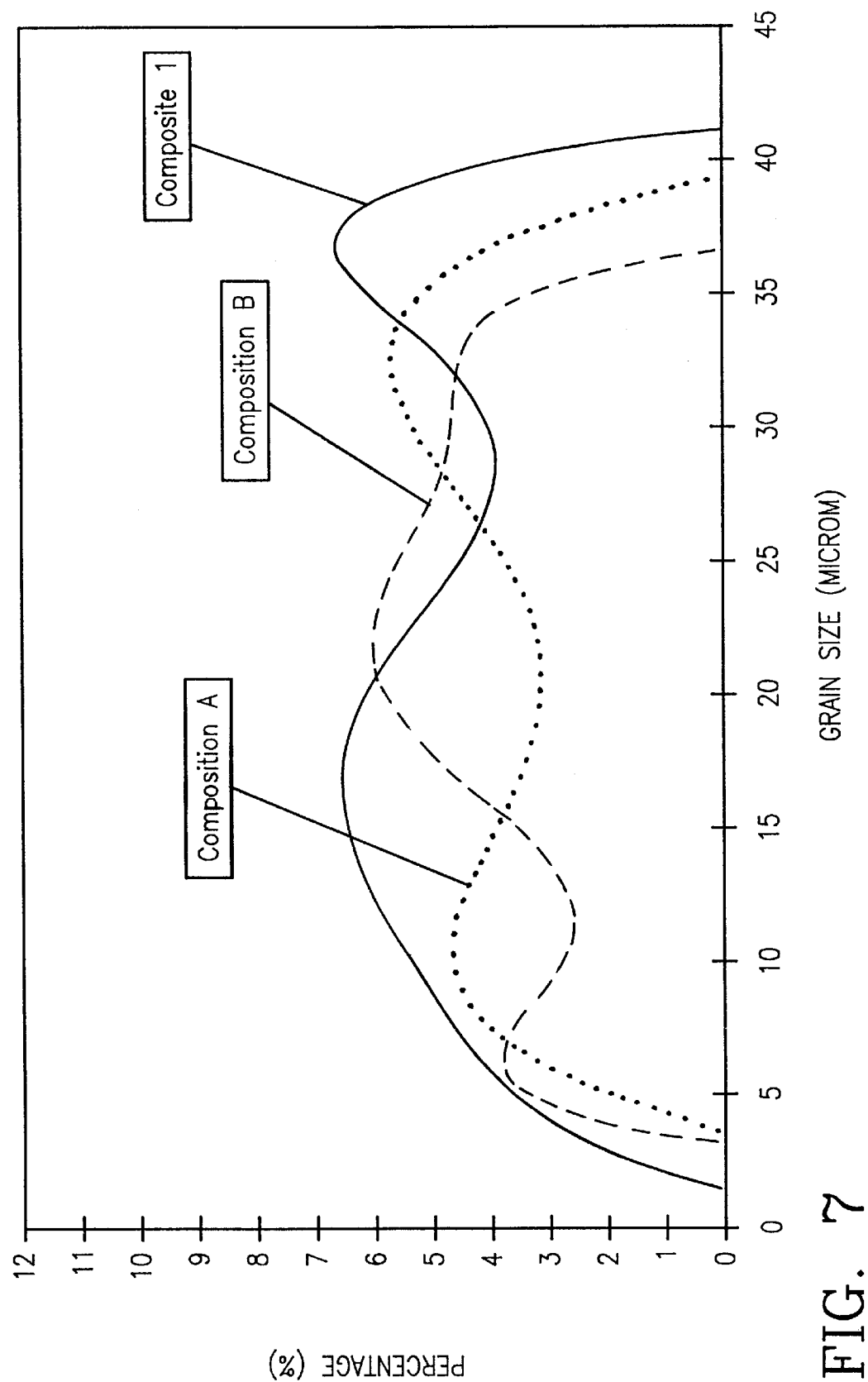
FIG. 7 is a chart showing the relative grain sizes in the first sintered composite as compared to the sintered individual compositions.

Referring to FIG. 7, taking a given percentage of the total grains represented in a representative cross sectional area, a majority of the cross sectional area is defined by grain sizes representing between approximately 75% and 125% of the given percentage. For example, in a representative cross sectional area, taking a given percentage of grain sizes of approximately 5.25%, the grain sizes that represent from approximately 3.9% to 6.5% of the total number of grains in the cross sectional area represent approximately 90% of the grains in the cross sectional area.

In the ferrimagnetic material of FIG. 7, the grain sizes range from approximately 1.5 micrometers to 41 micrometers, wherein approximately 90% of the grain sizes represent between 3.9% and 6.5% of the total number of grains. That is, within the grain size range, grains having a size of 3.9 micrometers to 40 micrometers represent 90% of the total number of grains, wherein no single grain size represents more than approximately 6.5% of the total number of grains.

As shown in FIG. 7, in contrast to the grain size range in the sintered composite of approximately 1.5 micrometers to 41 micrometers, an individually sintered first composition has a grain size range of approximately 3 micrometers to 36.5 micrometers and an individually sintered second composition has a grain size range of approximately 3.7 micrometers to 39.5 micrometers. Thus, the sintered composite has a greater range of grain sizes than either of the compositions. Further, a sintered first composition has a different temperature versus magnetic permeability relationship than a sintered second composition. The sintered composite has a different operating temperature versus magnetic permeability relationship than a sintered first composition and a different operating temperature versus magnetic permeability relationship than a sintered second composition.

Further, the range of grain sizes is randomly distributed throughout the ferrimagnetic material. Therefore, the ferrimagnetic material exhibits a homogeneous distribution with respect to any particular grain size.

The present ferrimagnetic material may be formed of a first ferrimagnetic material forming composition and a second ferrimagnetic material forming composition. The first ferrimagnetic material forming composition would define a first range of grain sizes upon sintering, and the second ferrimagnetic material forming composition would define a second range of grain sizes upon sintering. However, by combining the first and the second ferrimagnetic material forming compositions prior to sintering to form a composite and sintering the composite, the resulting ferrimagnetic material composite has a range of grain sizes that is greater than either the first or the second ferrimagnetic material forming composition individually. Further, the relationship between operating temperature and magnetic permeability for the sintered composite is different than the relationship between operating temperature and magnetic permeability for either of the sintered first and the sintered second ferrimagnetic material forming composition. The present ferrimagnetic material is formed of a first calcined composition and second calcined composition that are mixed together and sintered.

Method of Manufacture

Generally, it has been found that the desired ferrimagnetic material may be formed by combining a first composition which yields a first grain size range upon sintering and a second composition which yields a second grain size range upon sintering, combining the first and second composition to form a composite and sintering the composite. Preferably, the first and the second compositions are calcined prior to forming the composite. The first and the second compositions may be formed of different, or the same constituent elements. The first and the second compositions each form a ferrimagnetic material upon sintering. That is, either of the first and the second compositions could be sintered to form a ferrimagnetic material. Therefore, the term "composition" includes those combinations of materials that can form a ferrimagnetic material upon sintering.

Further, although the present invention is described in terms of the combining a first and a second composition, the present invention encompasses the combination of three or more compositions.

For those first and second compositions formed of common constituent elements but in different proportions, the first and second compositions may be selected from any of the following three compositions:

| Constituent | Composition-1 | Composition-2 | Composition-3 |
|---|---|---|---|
| $Fe_2O_3$ | 68.52% | 68.77% | 69.27% |
| $Mn_3O_4$ | 15.95% | 15.82% | 15.57% |
| ZnO | 15.53% | 15.41% | 15.16% |

The first and second compositions may thus be formed of identical constituent elements, wherein the relative proportions of the constituent elements differs between the first and second composition. Alternatively, the first and the second compositions may be formed of distinct constituent elements or merely have some common constituents.

Figure 1:
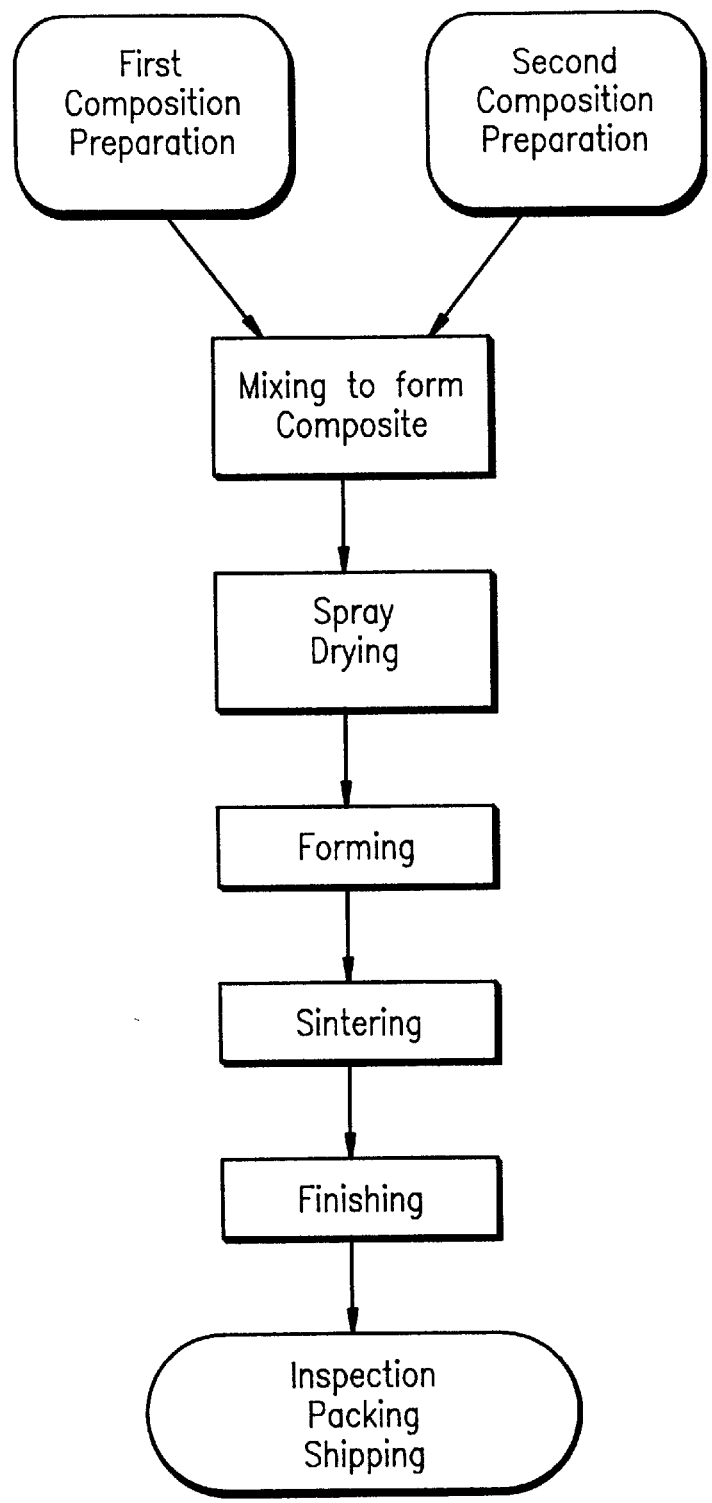
FIG. 1 is a flow chart of the general formation of the ferrimagnetic material.

The ferrimagnetic material is manufactured by sintering a composite of a calcined first and a calcined second composition. Referring to FIG. 1, the basic formation process for the composite ferrimagnetic material can be divided into six major steps (1) preparation of the respective compositions; (2) mixing the respective compositions to form a composite; (3) spray drying the composite; (4) forming the composite into parts; (5) firing or sintering; and (6) finishing the ferrimagnetic components.

Figure 2:
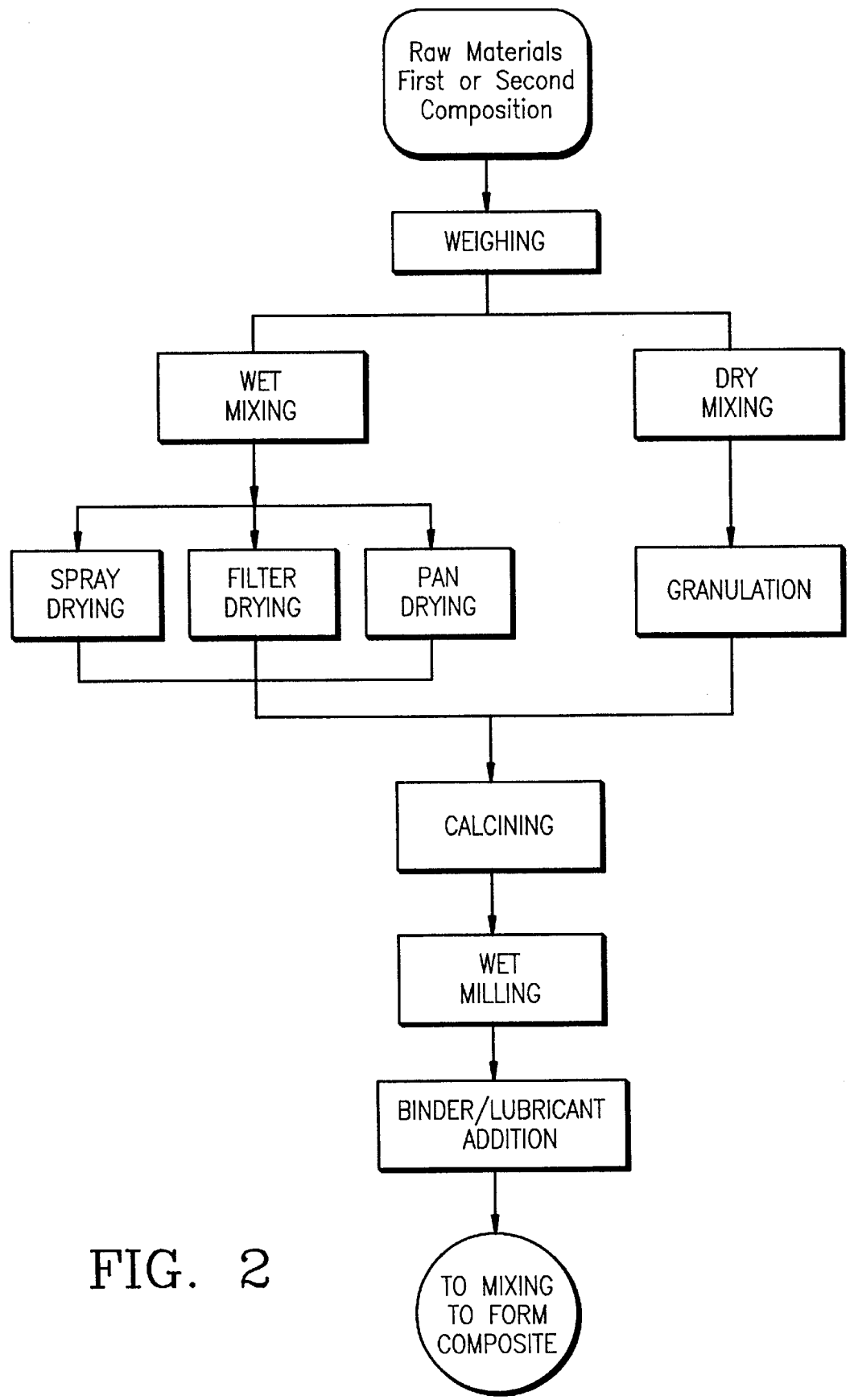
FIG. 2 is a flow chart of the formation of one of the compositions for use in the composite.
Figure 3:
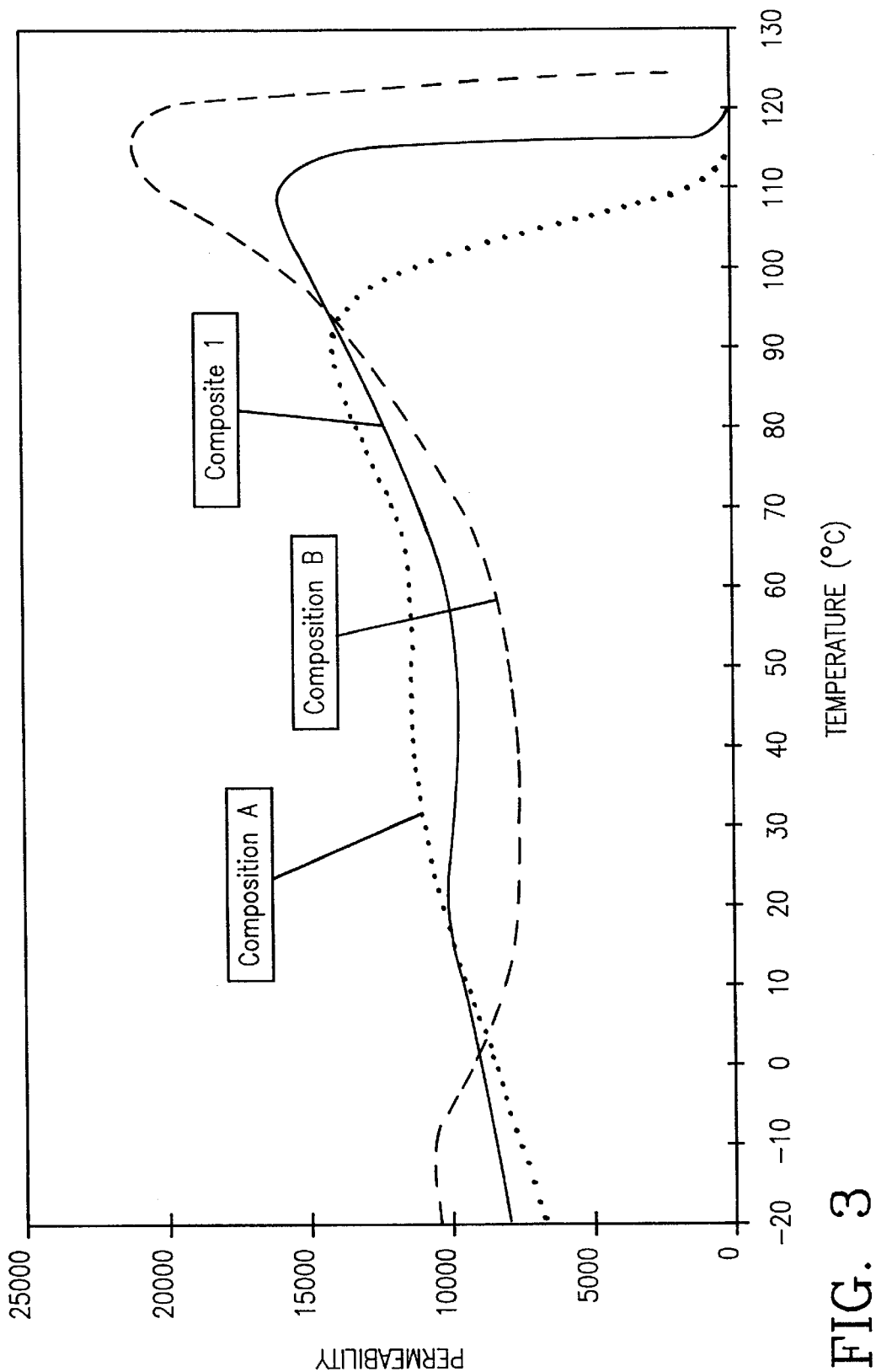
FIG. 3 is a chart showing the relationship of temperature and magnetic permeability of the separate compositions (if sintered) and a first composite (when sintered).
Figure 4:
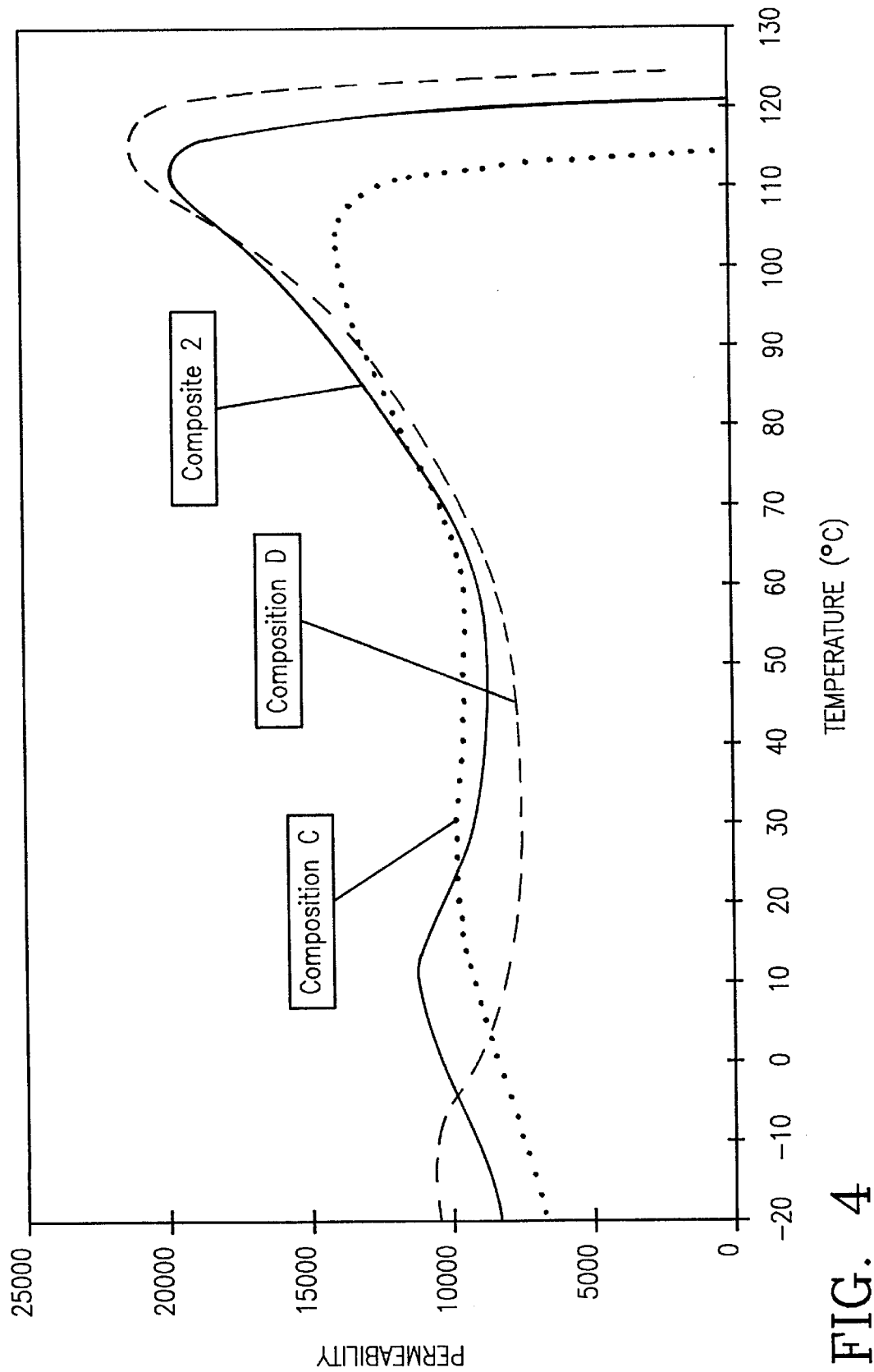
FIG. 4 is a chart showing the relationship of temperature and magnetic permeability of the separate compositions (if sintered) and a second composite (when sintered).

Referring to FIG. 2, a ferrimagnetic material powder processing flow diagram is shown for the first composition. As the first and the second compositions may be formed in substantially similar manners (with different constituents or different proportions of identical constituents), the formation of only the first composition is set forth in detail.

The first step in the preparation of the first composition starts with the chemical analysis of the raw materials, the oxides (or carbonates) of the major constituents such as iron oxide and oxides or carbonates of manganese and zinc or nickel and zinc. The impurities of these materials contributes directly to the quality of the final product and needs to be controlled to assure batch consistency. Preferably, the purity is at least 99.5% and further impurities are suppressed as much as possible. For example, excessive silica in manganese-zinc ferrite will severely limit the obtainable permeability.

The exact amount of the major constituents is weighed and thoroughly mixed into a homogeneous mixture. The chemical composition must be kept within allowable limits to achieve desired magnetic permeabilities. A preferable typical tolerance is approximately 0.1%. The mixing of the major constituents can be done in a dry process or water can be added to form a slurry. When wet mixing is used, a drying procedure is required to reduce the moisture content prior to calcining.

The mixture representing the first composition is then calcined, a prefiring process in which the powder temperature is raised to approximately 1000° C. in an air atmosphere. During calcining, there is a partial decomposition of the carbonates and oxides, evaporation of the volatile impurities in a homogenization of the powder mixture. There is a degree of spinel conversion during calcining and this prefiring step also reduces the shrinkage in the final sintering process.

After calcining, the powder is mixed with water and the slurry is ball milled to obtain small and uniform particle sizes. At this stage, the process binders and lubricants are added. The type of binder and lubricant is determined by the specific requirements of the finished product. The moisture content, flowability, and particle size distribution is controlled.

Similarly, the second composition formed and processed through ball milling.

After ball milling, the mean particle size within a given one of the compositions is approximately 1.1 microns. In the second composition, the mean particle size is also approximately 1.1 microns. Although the first and the second compositions are milled to equal mean particle sizes, it is understood the mean particle size of the compositions may be different. As the mean particle size is a factor in the resulting magnetic permeability of the ferrimagnetic material, the mean particle size of the compositions may be varied as dictated by the desired resulting ferrimagnetic material.

The ball milled first and second compositions are then mixed together in their slurry states to form the composite. That is, the first composition and the second composition are mixed together while both remain in the slurry state to form the composite. The composite is then blended or mixed until a substantially homogeneous mixture is formed.

In the present method, the first and the second compositions are mixed in a 1:1 ratio. However, it is understood the ratio of the first and second compositions may be as varied as 10:1, 1:10, or even greater. The particular ratio is impacted, at least in part, by the constituent materials in the respective compositions and the mean particle size.

The composite is not further ball milled, but is passed through the spray dryer.

Forming the Composite into Parts

The composite is then formed the desired component or part. The most commonly used technique is dry pressing the composite mixture into the part configuration. Other techniques are extruding and isostatic pressing. Dry pressing or compacting is done using a combined action of a top and bottom punch in a cavity such that uniform density in the part is obtained. The commercially available presses and tooling technology enable the pressing of multiple parts in very complex core shapes. The parts may be any of variety of shapes such as pot cores, RM cores, solid center post RM cores, E cores, U cores, EP cores toroids, multi-aperture cores, rods, tubes, strips and EMI cores. Sintering shrinkage is a function of the density of the green (unsintered) part, the press density is controlled in order to achieve a desired sintered dimension.

Further, green density uniformity must be controlled over the entire volume of a pressed part to prevent distortion upon sintering such as warpage of the E Core legs, or cracked cores.

Sintering

Figure 5:
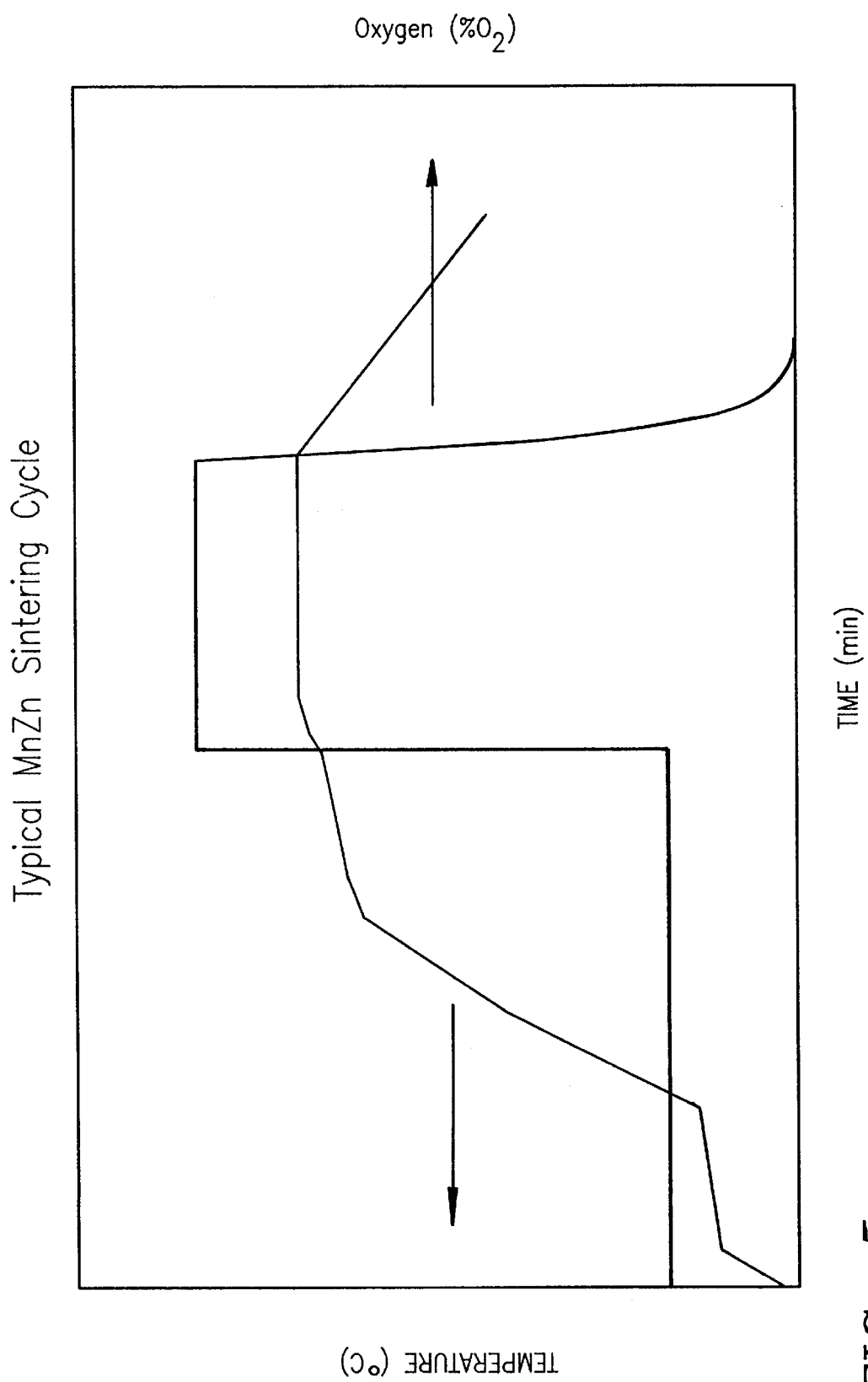
FIG. 5 is schematic MnZn ferrite sintering profile.

The component formed of the composite is then sintered. During sintering, the component acquires its magnetic and mechanical characteristics. Sintering includes heating the parts in a kiln or oven. The specific temperature profile and environment in which the sintering occurs depends on the specific part and the constituents of the ferrimagnetic material. As shown in FIG. 5, the temperature and atmosphere are varied throughout the sintering process.

The sintering of MnZn ferrites requires a relationship between time, temperature and atmosphere along each phase of the sintering cycle. Sintering starts with a gradual ramping up from room temperature to approximately 800° C. as impurities, residual moisture, binders, and lubricants are burned out of the product. The atmosphere in this part of the sintering cycle is air.

The temperature is further increased to the final sinter temperature of approximately 1000–1500° C., depending on the type material. While the temperature is decreasing, a non oxidizing gas, such as nitrogen, is introduced into the kiln to reduce the oxygen content of the kiln atmosphere. During the cool-down cycle, a reduction of oxygen percentage is an important factor in obtaining high quality MnZn ferrites.

The sintering of nickel-zinc ferrites occurs at lower temperatures, generally in the range of 1000–1200° C. This material may be sintered in an air atmosphere.

Temperatures constituting the sintering process must be maintained within relatively narrow tolerances to obtain the desired physical and magnetic properties. Improper control during the initial stages of sintering can result in physical problems due to overly rapid binder removal. Poorly controlled initial stages of heating or later stages of cooling, can result in stress induced fracture. A difference of as little as 3° C. out of 1400° C. in peak temperature can have a profound negative effect on final properties.

In addition, proper control of the atmosphere during sintering is necessary to achieve the desired magnetic properties. It has been found, that inadequate control to the extent of 0.1% oxygen during the cooling stages of sintering a MnZn ferrite or even 0.01% oxygen at the end of the process can have extremely deleterious effects.

During sintering, the parts shrink to their final dimensions. Different material and processing techniques result in variance in this shrinkage, but typical linear shrinkage ranges from 10 to 20% of the formed dimensions. The final part dimensions can be held to mechanical tolerances of +/-2% of the nominal part dimensions.

As a result of sintering, the parts achieve their highest magnetic permeability. The ferrimagnetic material thus formed exhibits the substantially continuous range of grain sizes in a substantially uniform distribution throughout the range of grain sizes.

The ferrimagnetic parts thus formed may be immediately incorporated into an operating environment. Alternatively, the ferrimagnetic parts may be subjected to a batch treatment for centering the magnetic permeability at a given value (which is less than the sintered magnetic permeability).

Suppression of Magnetic Permeability

The sintered parts are then tumble processed to reduce the magnetic permeability of the parts. The parts are tumbled in a flowable medium such as grit, sand, or spheres or particles of ceramic, glass, sand, or metal. The tumbling media and tumbling parameters are dictated by the composition of the part, the part size and the necessary depression of the magnetic permeability.

While it is only necessary to depress the magnetic permeability below a target permeability, preferably, the tumbling is carried out until the permeability of the parts is approximately ½ of the sintered permeability.

Figure 6:
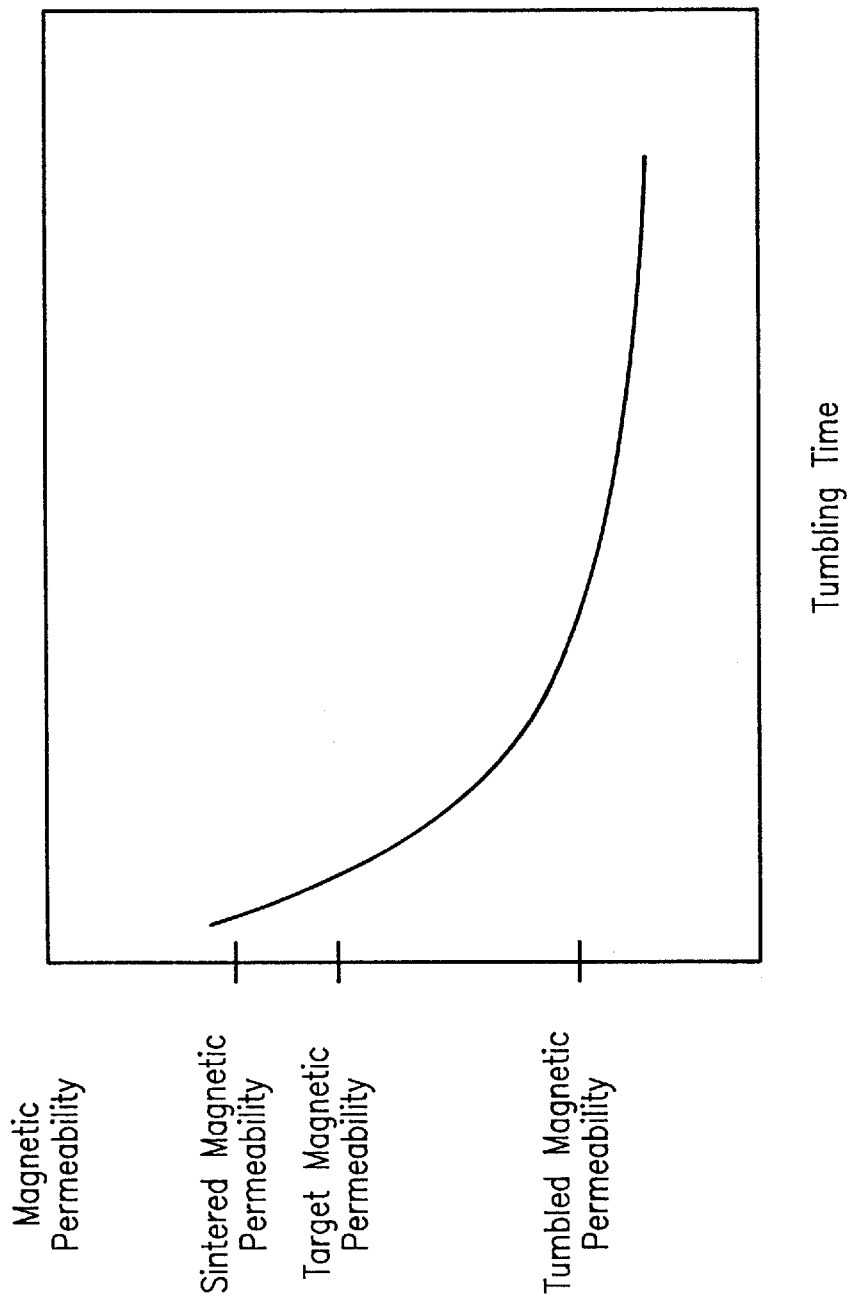
FIG. 6 is a chart of the relation of magnetic permeability to tumbling time.

Referring to FIG. 6, the dependence of magnetic permeability on tumbling decreases in time, and especially after the permeability has been suppressed to approximately half its original sintered value. By suppressing the permeability to approximately half of the sintered permeability, the uniformity of the suppressed magnetic permeability within a given tumbled batch is within a smaller tolerance, than if suppression is less than 50% of the sintered magnetic permeability.

Setting the Magnetic Permeability to the Target Value

The sintered and tumbled parts having a magnetic permeability below the target permeability are then exposed to a chemical wash. The chemical wash is preferably an acid wash. Muriatic, phosphoric, nitric and sulfuric acids may be used. The preferred acid is hydrochloric acid at room temperature and at approximately 36% concentration. The exposure of the tumbled parts to the acid wash restores the magnetic permeability of the parts. The length of exposure of the parts to the chemical wash is monitored so that the wash is terminated upon the parts reaching the target magnetic permeability.

If the acid wash is terminated prematurely, the wash may be reinstated to continue restoring the magnetic permeability to the target value. Conversely, if the acid wash is carried on past the target permeability, the parts may be retumbled to suppress the magnetic permeability below the target permeability and the parts rewashed to obtain the target permeability.

The monitoring of the parts in the acid wash may be achieved in a variety of ways. Specifically, three small samples of a batch of tumbled parts are separated from the remaining batch. The first sample is exposed to the acid wash for two minutes; the second sample is exposed to the acid wash for five minutes and the third sample exposed to the acid wash for ten minutes. The magnetic permeability via the inductance of each sample is measured and plotted on a graph of inductance (magnetic permeability) v. time. Then from the graph, the chemical wash time to obtain the target magnetic permeability is determined and the remaining portion of the batch is exposed to the chemical wash for that period of time.

It is understood the actual test times may vary depending upon the specific acid wash and the configuration of the part. The times are selected so that one subset exposure sets a magnetic permeability less than the target permeability and another subset exposure sets a magnetic permeability greater than the target permeability.

Alternatively, the magnetic permeability may be measured by monitoring the inductance of the material. Generally, magnetic permeability and inductance are related by $$L = \frac{.4\pi\mu N^2 A_e}{l_e} \times 10^{-4}$$

where L is the inductance in Henries; $l_e$ is the effective magnetic path length; $A_e$ is the cross sectional area of the core; $\mu$ is the effective magnetic permeability of the material; and N is the number of turns. A sample of the batch may be strung on a single wire and the sample and remainder of the batch placed in the acid wash. As the measured inductance relates to the magnetic permeability, for monitoring toroidal cores, $$L = 2\mu N^2 H \ln\frac{OD}{ID} \times 10^{-9}$$

where L is the inductance in Henries; $\mu$ is the magnetic permeability; h is the height in centimeters; N is the number of turns; OD is the outer diameter and ID is the inner diameter of the part, the magnetic permeability can be continuously monitored by continuously monitoring the inductance.

Upon the inductance reaching the level corresponding to the target magnetic permeability, the parts are removed from the acid wash and rinsed with water to terminate further restoration of the magnetic permeability.

It is known that inductance is related to magnetic permeability by the above formula. Therefore, as the inductance of the sample parts is continuously monitored, the changing magnetic permeability may be monitored and stopped at the target permeability. The specific time necessary for the restoration of the magnetic permeability depends upon a number of factors including the acid, the specific material of the ferrite; the amount the magnetic permeability is depressed by tumbling and the temperature of the acid. The continuous monitoring of the magnetic permeability (via the inductance) accommodates all the variable parameters. That is, by continuously monitoring the change in magnetic permeability, the resulting influence of a change in any of the parameters is accounted for in the duration of the wash.

The apparatus for implementing the process includes a wash tub, a tray, and an inductance monitor. In an automated system, the apparatus further includes a controller and a lifter.

The wash tub is an acid resistant vessel. Similarly, the tray is acid resistant and is porous or vented to permit a free flow of acid into and out of the tray. The tray is connected to the lifter for selectively placing the tray in contact with the acid and out of contact with the acid. The lifter is also operable over a limited range to slightly oscillate the tray to induce a flow of acid across the parts.

The monitor is any of a variety of commercially available inductance meters such as HP-4284A LCR meter. The controller is a desktop computer operably connected to the lifter and the monitor. The controller receives signals from a monitor which represent the inductance of the monitored part(s), and translates the inductance to a corresponding magnetic permeability upon reaching an inductance value corresponding to the target magnetic permeability. The controller directs the lifter to remove the tray from the acid wash and initiate a rinse of the parts in a rinse tub.

In a specific batch processing of a MnZn ferrite, the powder formation and forming is accomplished as well known in the industry. The parts were sintered at a temperature of 1380° C. to achieve a maximum magnetic permeability of approximately 12,000 to 13,000. The sintered parts were then tumbled in a fine 60 grit sand in a ratio of 1 part media to two parts ferrites at 80 Rpm's in a Harper tumbler. The Harper tumbler is a standard tumbler and rotates the parts about two axes. The ratio of tumbling media to parts may be varied between 1:1 to 1:3, however, a ratio of 1:2 is preferable. The tumbling occurs for approximately 3 to 4 minutes and suppresses the magnetic permeability to approximately 5,000 to 6,000. The tumbling also rounds the sharp edges of the sintered parts to enhance subsequent winding operations.

A sample of the tumbled parts is strung onto a conductive wire and connected to the inductance monitor. In the present embodiment, a 26 gage wire having a length of approximately 7 feet is used to retain the sample parts for measuring inductance. The monitored parts and remaining portion of the batch are put in the tray and immersed in a hydrochloric acid of approximately 36% solution at room temperature. A sufficient amount of acid is employed to cover all the parts and permit a slight agitation so that a relatively uniform concentration of acid is exposed to the parts. Depending upon the age of the acid, the part configuration on the specific material, the wash time may be approximately 5 to 15 minutes. Upon the monitored inductance of the sample parts reaching a value corresponding to the target permeability, the entire batch of parts are removed from the chemical wash and immersed in the water tub and then rinsed with water.

This process allows adjustment of the magnetic permeability of a batch of parts. That is, if a given batch of parts has a given distribution profile of magnetic permeability about a given value which is greater than a target value, the process allows the distribution profile of the batch to be shifted and accurately centered about the target value.

This process also accommodates variances in manufacturing of the sintered part. Specifically, for a given batch (first and second composition powder preparation, formation and sintering) fluctuations in parameters such as kiln temperature may result in an undesirably wide distribution of the parts about a given magnetic permeability. The selection of portions of the batch having a relatively narrow distribution about a given magnetic permeability (higher than the target permeability) may be subjected to the process to center the distribution at the target permeability. Therefore, by individually exposing separate sub batches (each sub batch having a narrow tolerance about a given magnetic permeability) to the process, an entire batch can be manufactured to center the distribution about the target permeability within the narrow tolerances of the sub batches.

By this method, it has been found that the distribution of the magnetic permeability of parts having 10,000 perm may be shifted to within approximately +/−5% of the target permeability and the composite grain structure allows greater thermal stability at the target magnetic permeability.

The ability to establish a magnetic permeability in response to monitoring the change in the permeability, allows a greater accuracy of the final part. Further, the monitored adjustment of the magnetic permeability can accommodate uncontrollable, or even unintended variances in the formation of the sintered part. That is, formation and sintering of a part may be used to obtain a magnetic permeability greater than the target permeability.

The suppression of the magnetic permeability below the target level and preferably to a relatively tumbling insensitive level, followed by the controlled and monitored restoration of a portion of the original sintered magnetic permeability allows the present process to produce ferrites wherein the center of the distribution of the magnetic permeability is within approximately +/−5% of a target magnetic permeability and the composite grain structure allows greater thermal stability at the target magnetic permeability.

The parts having the target magnetic permeability may then be finished by a coating with nylon, epoxy paint or parylene. Nylons and epoxy paints typically need a minimum coating thickness of approximately 0.005 inches to insure uniform protection. Because of this restriction, they are used mainly on toroids with an outer diameter of 0.500 inches or greater. One advantage of these coatings is that the color can be varied for core material identification without stamping.

A smooth coating can be provided to finish the part for operable assembly. This coating is preferably soft to prevent stressing the core upon curing or during temperature cycling, and has a low coefficient of friction and can withstand normal operating environments including cleaning solvents.

Parylene™ C is used for smaller cores. The Parylene™ is vapor deposited and produces an exceptionally uniform coating having a thickness of approximately 0.0006 inches. The epoxy may be sprayed on larger cores in providing a variable thickness of about 0.002 to 0.012 inches.

The present ferrimagnetic material and method of forming the ferrimagnetic material provides the ferrimagnetic material with enhanced thermal stability. That is, the permeability of the ferrimagnetic material may be maintained within approximately 20% of a nominal value for an approximately 100° C. temperature range. The present invention provides a ferrimagnetic material which may exhibit a magnetic permeability within predetermined limits of a value through a relatively extended temperature range.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

We claim:

1. A method of producing a ferrimagnetic material, comprising:
   (a) calcining a first unsintered ferrimagnetic material producing composition to form a first calcined unsintered ferrimagnetic material producing composition having incomplete spinel conversion;
   (b) calcining a second unsintered ferrimagnetic material producing composition to form a second calcined unsintered ferrimagnetic material producing composition having incomplete spinel conversion;
   (c) combining the first unsintered calcined ferrimagnetic material producing composition and the second unsintered calcined ferrimagnetic material producing composition to form a composite; and
   (d) sintering the composite to produce the ferrimagnetic material.

2. The method of claim 1, further comprising forming the first unsintered calcined ferrimagnetic material producing composition into a first particle size distribution and forming the second unsintered calcined ferrimagnetic material producing composition into a second particle size distribution, the first particle size distribution and the second particle size distribution selected to form a substantially uniform distribution of continuous grain sizes in the sintered ferrimagnetic material.

3. A method of producing a ferrimagnetic material, comprising:
   (a) calcining a first unsintered ferrimagnetic material producing composition to form a first calcined unsintered ferrimagnetic material producing composition;
   (b) calcining a second unsintered ferrimagnetic material producing composition to form a second calcined unsintered ferrimagnetic material producing composition;
   (c) combining the first unsintered calcined ferrimagnetic material producing composition and the second unsintered calcined ferrimagnetic material producing composition to form a composite; and
   (d) sintering the composite to produce the ferrimagnetic material, the ferrimagnetic material having a substantially uniform distribution of grain sizes throughout a range in a homogeneous distribution in the ferrimagnetic material, the range of grain sizes in the ferrimagentic material being greater than a range of grain sizes resulting from individually sintering the first composition and the second composition.

4. A method of forming a ferrimagnetic material, comprising:
   (a) forming an unsintered calcined first ferrimagnetic material forming composition of incomplete spinel conversion into a multitude of particles having a first particle size range defined by a first upper limit and a first lower limit;
   (b) forming an unsintered calcined second ferrimagnetic material forming composition of incomplete spinel conversion into a multitude of particles having a different second particle size range defined by a second upper limit and a second lower limit;
   (c) combining the unsintered calcined first ferrimagnetic material forming composition particles and the unsintered calcined second ferrimagnetic material forming composition particles to form an unsintered composite; and
   (d) sintering the composite to form the ferrimagnetic material.

5. The method of claim 4, wherein the step of sintering the composite to form the ferrimagnetic material forms a grain size range in the ferrimagnetic material having a lower size limit lower than the lower of the first lower limit and the second lower limit, and an upper size limit higher than the first upper limit and the second upper limit.

6. The method of claim 4, further comprising forming the unsintered calcined second ferrimagnetic material forming composition to include constituent elements distinct from the unsintered calcined first ferrimagnetic material forming composition.

7. The method of claim 4, further comprising the step of forming the unsintered calcined second ferrimagnetic material forming composition to include constituent elements common with the unsintered calcined first ferrimagnetic material forming composition.

8. The method of claim 4, wherein the step of combining the unsintered calcined first ferrimagnetic material forming composition and the unsintered calcined second ferrimagnetic material forming composition includes forming a slurry.

9. The method of claim 4, wherein the step of forming an unsintered calcined first ferrimagnetic material forming composition defines a first mean particle size and the step of forming an unsintered calcined second ferrimagnetic material forming composition defines a second mean particle size.

10. The method of claim 9, further comprising rendering the first mean particle size and the second mean particle size substantially equal.

11. The method of claim 9, further comprising rendering the first mean particle size and the second mean particle size distinct.

12. The method of claim 4, wherein the step of combining the calcined first ferrimagnetic material forming composition particles and the calcined second ferrimagnetic material forming composition particles in an unsintered condition to form a composite includes combining the first ferrimagnetic material forming composition and the second ferrimagnetic material forming composition in substantially equal parts.

13. A method of producing a ferrimagnetic material, comprising:
   (a) sintering together a first unsintered calcined ferrimagnetic forming material having partial spinel conversion and a second unsintered calcined ferrimagnetic forming material having partial spinel conversion to produce the ferrimagnetic material.

14. The method of claim 13, wherein the first unsintered calcined ferrimagnetic forming material and the second unsintered calcined ferrimagnetic forming material include identical constituent elements.

15. The method of claim 13, further comprising processing the first unsintered calcined ferrimagnetic forming material to a first mean particle size prior to sintering with the second unsintered calcined ferrimagnetic forming material.

16. The method of claim 13, further comprising processing the first unsintered calcined ferrimagnetic forming material to a first mean particle size and processing the second unsintered calcined ferrimagnetic forming material to a second substantially equal mean particle size.

17. The method of claim 13, further comprising forming the first unsintered calcined ferrimagnetic forming material to have a different magnetic permeability to temperature relationship than the second unsintered calcined ferrimagnetic forming material.

18. A ferrimagnetic material, comprising:
(a) a sintered ferrimagnetic body formed of a first ferrimagnetic material forming composition and a second ferrimagnetic material forming composition, the ferrimagnetic body having a substantially continuous range of grain sizes in a substantially uniform distribution throughout the range of grain sizes, the range of grain sizes in the ferrimagnetic body being greater than a first range of grain sizes resulting from individually sintering the first ferrimagnetic material forming composition and a second range of grain sizes resulting from individually sintering a second ferrimagnetic material forming composition.

19. The ferrite of claim 18, wherein the range of grain sizes in the ferrimagnetic body is substantially uniformly distributed throughout the sintered body.

20. A ferrimagnetic material, comprising:
(a) a ferrimagnetic body formed by sintering a first unsintered calcined ferrimagnetic material forming composition comprising manganese oxide, zinc oxide and iron oxide, and a second unsintered calcined ferrimagnetic material forming composition comprising manganese oxide, zinc oxide and iron oxide, wherein the first composition is different than the second composition.

21. The ferrimagnetic material of claim 20, wherein the sintered ferrimagnetic body includes grains having a substantially continuous range of grain sizes in a substantially uniform distribution throughout the range of grain size.

22. The ferrimagnetic material of claim 20, wherein the first unsintered calcined ferrimagnetic material forming composition has a different operating temperature versus magnetic permeability relation than the second unsintered calcined ferrimagnetic material forming composition.

23. The ferrimagnetic material of claim 20, wherein the first unsintered calcined ferrimagnetic material forming composition has a different particle size than the second unsintered calcined ferrimagnetic material forming composition.

24. A method of forming a ferrimagnetic material, comprising:
(a) forming a first composition which yields upon sintering a first ferrimagnetic material having a first magnetic permeability versus temperature relation;

(b) calcining the first composition to an incomplete spinel conversion;

(c) forming the calcined first composition to a first particle size distribution in an unsintered condition;

(d) forming a second composition which yields upon sintering a second ferrimagnetic material having a second magnetic permeability versus temperature relation;

(e) calcining the second composition to an incomplete spinel conversion;

(f) forming the calcined second composition to a second particle size distribution in an unsintered condition;

(g) combining the first unsintered composition particles and the second unsintered composition particles to form a composite; and (h) sintering the composite.

25. A ferrimagnetic material having a relatively stable magnetic permeability to temperature relationship, comprising:
(a) a ferrimagnetic body formed from sintering together a first calcined unsintered ferrimagnetic material producing composition and a second calcined unsintered ferrimagnetic material producing composition, the ferrimagnetic body having a grain size range defined by an upper grain size and a lower grain size, the upper grain size being greater than an upper grain size of the two calcined unsintered compositions and the lower grain size being less than a lower grain size of the two calcined unsintered compositions.

26. A ferrimagnetic material having a relatively stable magnetic permeability to temperature relationship, comprising:
(a) a ferrimagnetic body formed from sintering together a first calcined unsintered ferrimagnetic material producing composition and a second calcined unsintered ferrimagnetic material producing composition, the first unsintered calcined ferrimagnetic material forming composition being different than the second unsintered calcined ferrimagnetic material forming composition.

27. A ferrimagnetic material having a relatively stable magnetic permeability to temperature relationship, comprising:
(a) a ferrimagnetic body formed from sintering together a first calcined unsintered ferrimagnetic material producing composition and a second calcined unsintered ferrimagnetic material producing composition, the first unsintered calcined ferrimagnetic material forming composition having a different particle size distribution than the second unsintered calcined ferrimagnetic material forming composition.

* * * * *